UNITED STATES PATENT OFFICE.

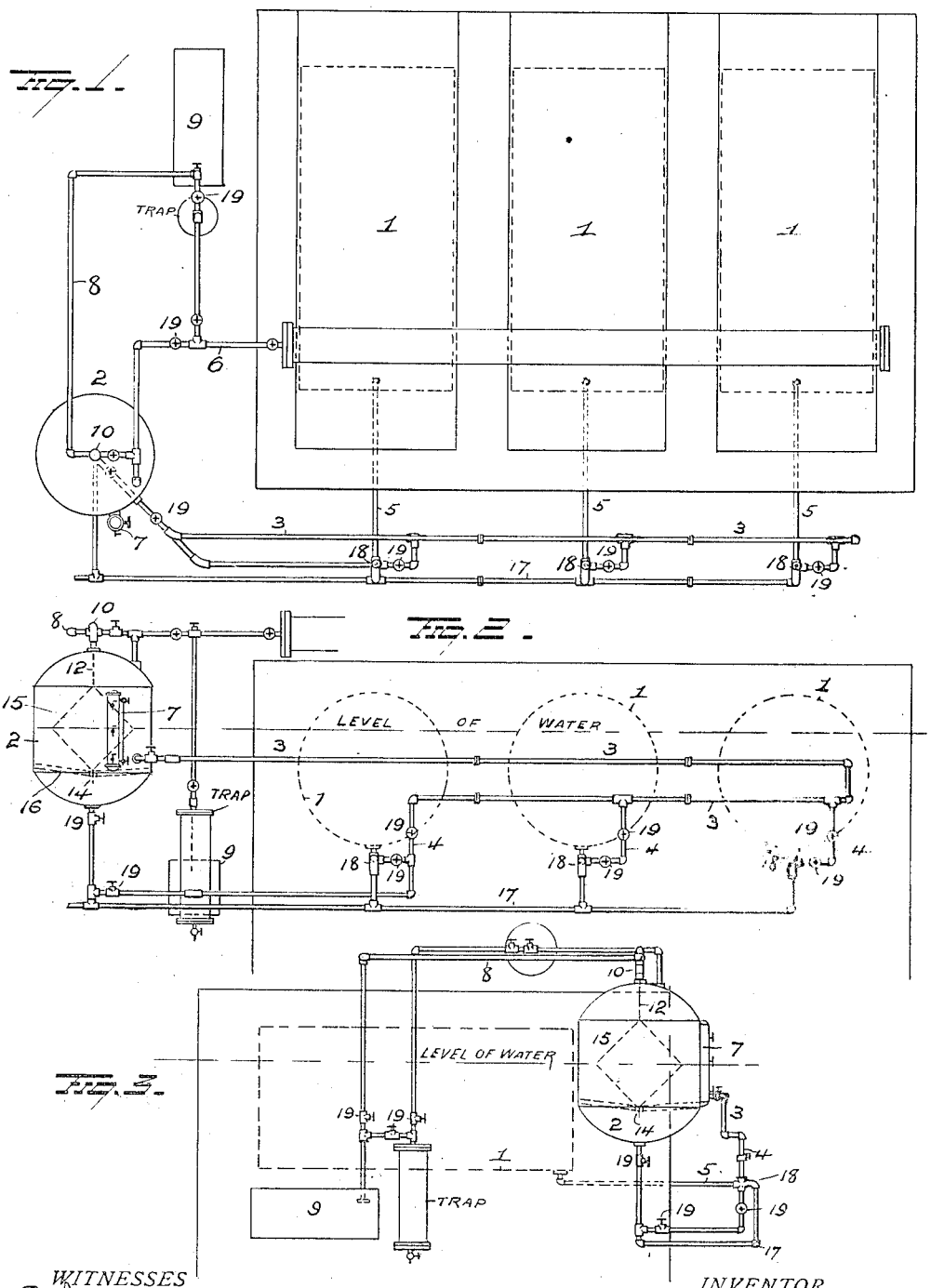

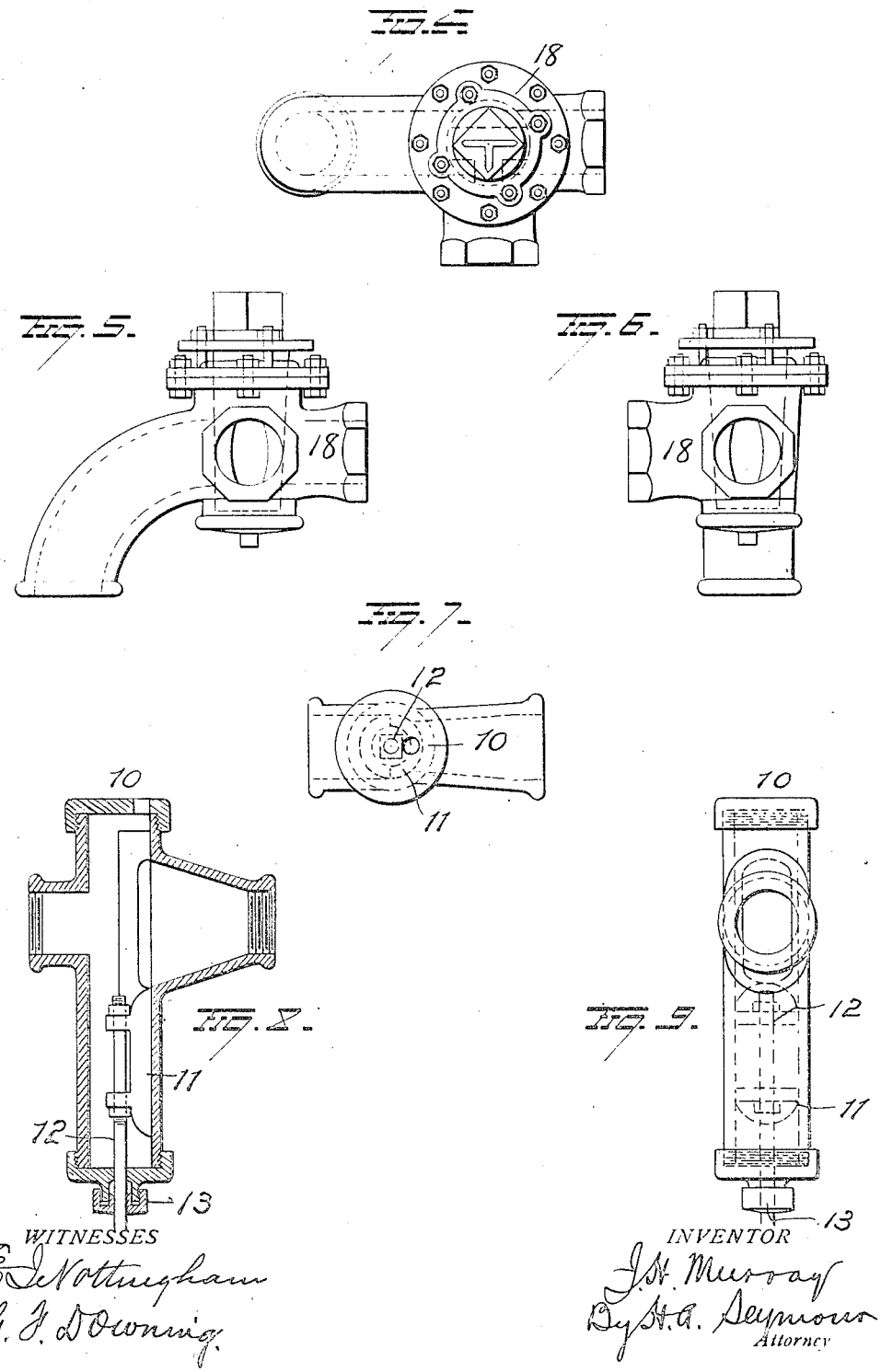

JAMES H. MURRAY, OF FAIRFIELD, MAINE.

AUTOMATIC BOILER-FEEDER.

No. 852,286.     Specification of Letters Patent.     Patented April 30, 1907.

Application filed May 18, 1906. Serial No. 317,603.

*To all whom it may concern:*

Be it known that I, JAMES H. MURRAY, a resident of Fairfield, in the county of Somerset and State of Maine, have invented certain new and useful Improvements in Automatic Boiler-Feeders; and I do hereby declare the following to be a full, clear, and exact description of the invention, such as will enable others skilled in the art to which it appertains to make and use the same.

My invention relates to improvements in automatic boiler feeders, the object of the invention being to provide an improved regulator which will automatically control the level of water in the boiler or boilers by regulating the operation of the feed pump, as the regulator will control the supply of steam passing to the pump.

A further object is to provide an improved arrangement of pipes connecting the boilers, regulator, and drain, and provide three-way cocks at the juncture of the water pipes and blow off pipes of the boilers to control the flow of water and cut out any boiler from the circuit and open it to the drain.

With these and other objects in view, the invention consists in certain novel features of construction and combinations and arrangements of parts as will be more fully hereinafter described and pointed out in the claims.

In the accompanying drawings, Figure 1 is a plan view illustrating my improvements. Fig. 2 is an end view. Fig. 3 is a side view. Figs. 4, 5, and 6, are detail views of one of the plug cocks, and Figs. 7, 8, and 9, are detail views of the steam regulating valve.

1, 1, 1, represent a series or battery of boilers, and 2 is my improved regulator chamber, all having the same level of water, and the same steam pressure, as the regulator is connected by a main pipe 3 and branch pipes 4, with the blow-off pipes 5 of the boilers, and a steam pipe 6 conveys steam from the boilers to the upper part of the regulator chamber. A gage 7 is located outside of the regulator chamber 2, to indicate the water level therein and in the boilers, as the boilers and regulator are normally maintained in open communication with each other and conditions in all are the same.

8 represents the steam pipe directing steam to the pump 9, for forcing water to the boilers, and this pipe 8 has a valve chamber 10 located above the regulator chamber 2. In the valve chamber 10, a sliding cut-off valve 11 is located and its stem 12, which extends through a stuffing box 13 at the top of the regulator chamber, is connected with a float 15 in the regulator chamber. The float 15 is preferably half submerged in the water and has a depending guide rod 14 located in a cross bar 16 in the regulator chamber to prevent any lateral displacement of the float. It will thus be seen that as the water rises in the boilers and regulator chamber, the float will rise and move the valve 11 upward to close or partially close the steam passage, and as the water falls, the float will fall to open the steam passage to the steam pump, and by this means the water will be automatically fed and the feed stopped without any attention from the attendant.

The water pipe 3, as above explained, is connected by branch pipes 4 with the boiler blow-off pipes 5, and the latter connect with drain pipe 17. At the juncture of pipes 4 and 5, three way plug cocks 18 are located. These cocks are normally turned to open communication between pipes 3 and 5 and close the passage to the drain pipe 17, so that the water circuit with the regulator is maintained open with all the boilers, but should it be desired to blow-off from any boiler, its plug cock 18 can be turned to close pipe 4 and open communication with the drain, and other valves 19 are located in the several pipes to permit any boiler to be entirely cut out of the circuit, should this be desired.

A great many slight changes might be made in the general form and arrangement of the parts described without departing from my invention, and hence, I would have it understood that I do not restrict myself to the precise details set forth but consider myself at liberty to make such slight changes and alterations as fairly fall within the spirit and scope of my invention.

Having fully described my invention, what I claim as new and desire to secure by Letters-Patent is:—

1. In an apparatus of the character described, the combination with a series of boilers, of a regulator chamber, a drain pipe, blow-off pipes connecting all the boilers with the drain pipe, a water pipe connecting the regulator chamber with all the blow off pipes, three-way plug cocks at the juncture of the water pipes and blow-off pipes, and means controlled by the level of water in the regulator chamber for controlling the feed of water to the boilers.

2. In an apparatus of the character described, the combination with a series of boilers, of a regulator chamber, a drain pipe, blow-off pipes connecting all the boilers with the drain pipe, a water pipe connecting the regulator chamber with all the blow-off pipes, three-way cocks at the juncture of the water pipes and blow-off pipes normally turned to open communication with the boiler and close communication with the drain, valves permitting the cutting out of any boiler from the circuit, and means in the regulator chamber controlling the feed of water to the boilers.

In testimony whereof, I have signed this specification in the presence of two subscribing witnesses.

JAMES H. MURRAY.

Witnesses:
 JESSIE STEVENS,
 GEO. G. WEEKS.